United States Patent
Kobayashi et al.

(10) Patent No.: US 11,302,328 B2
(45) Date of Patent: Apr. 12, 2022

(54) VOICE INTERACTIVE DEVICE AND METHOD FOR CONTROLLING VOICE INTERACTIVE DEVICE

(71) Applicants: HISENSE VISUAL TECHNOLOGY CO., LTD., Qingdao (CN); TOSHIBA VISUAL SOLUTIONS CORPORATION, Amori (JP)

(72) Inventors: Takero Kobayashi, Akishima Tokyo (JP); Kunio Honsawa, Ome Tokyo (JP); Hidehito Izawa, Hanno Saitama (JP); Reiko Kawachi, Nishitama Tokyo (JP); Hiroyuki Nomoto, Sayama Saitama (JP)

(73) Assignees: HISENSE VISUAL TECHNOLOGY CO., LTD., Qingdao (CN); TOSHIBA VISUAL SOLUTIONS CORPORATION, Amori (JP)

( * ) Notice: Subject to any disclaimer, the term of this patent is extended or adjusted under 35 U.S.C. 154(b) by 0 days.

(21) Appl. No.: 16/911,202

(22) Filed: Jun. 24, 2020

(65) Prior Publication Data

US 2020/0380986 A1 Dec. 3, 2020

Related U.S. Application Data

(63) Continuation of application No. 15/893,509, filed on Feb. 9, 2018, now Pat. No. 10,726,837.

(30) Foreign Application Priority Data

Nov. 2, 2017 (JP) .............................. JP2017-212851

(51) Int. Cl.
*G10L 15/00* (2013.01)
*G10L 15/04* (2013.01)
*G10L 15/22* (2006.01)
(Continued)

(52) U.S. Cl.
CPC .............. *G10L 15/22* (2013.01); *G10L 15/08* (2013.01); *G10L 15/30* (2013.01); *G10L 2015/088* (2013.01)

(58) Field of Classification Search
CPC .............. G10L 15/22; G10L 2015/223; G10L 15/1822; G10L 2015/227; G10L 13/033;
(Continued)

(56) References Cited

U.S. PATENT DOCUMENTS 6,052,666 A 4/2000 Diehl et al.
9,721,586 B1 * 8/2017 Bay ........................ H04R 1/345
(Continued)

FOREIGN PATENT DOCUMENTS

JP 2004-333704 11/2004
JP 2006-003743 1/2006
(Continued)

OTHER PUBLICATIONS

European Patent Office, Extended European Search Report Issued in Application No. 18156116.8, dated Jul. 25, 2018, Germany, 8 pages.

*Primary Examiner* — Michael Ortiz-Sanchez
(74) *Attorney, Agent, or Firm* — Crowell & Moring LLP

(57) ABSTRACT

According to one embodiment, a voice interactive device configure to transmit a voice content to a plurality of voice interactive services through a network, wherein the plurality of voice interactive services are selected based at least in part on the voice content.

18 Claims, 12 Drawing Sheets

(51) Int. Cl.
*G10L 15/30* (2013.01)
*G10L 15/08* (2006.01)

(58) Field of Classification Search
CPC ..... G10L 15/1815; G10L 15/19; G10L 15/26; G10L 2015/225; G10L 17/22; G10L 2015/228; G10L 15/30; G10L 15/08; G10L 21/0208; G10L 13/027; G10L 15/02; G10L 15/20; G10L 2015/221; G10L 2021/02082; G10L 2021/02166; G10L 21/06; G10L 25/00; G10L 25/51; G10L 15/00; G10L 15/16; G10L 17/00; G10L 2015/088; G10L 21/00; G10L 25/30; G06F 3/167; G06F 16/3329; G06F 3/0482; G06F 40/30; G06F 11/3055; G06F 11/328; G06F 16/61; G06F 3/165; G06F 9/453; G06F 9/454; G06F 16/433; G06F 16/438; G06F 16/444; G06F 16/45; G06F 16/48; G06F 16/483; G06F 16/487; G06F 16/489; G06F 16/632; G06F 16/68; G06F 16/90332; G06F 2203/04803; G06F 2203/04806; G06F 2203/04808; G06F 3/0481; G06F 3/04815; G06F 3/0484; G06F 3/04842; G06F 3/04845; G06F 3/0488; G06F 3/04883; G06F 3/16; G06F 40/174; G06F 40/186; G06F 40/40

See application file for complete search history.

(56) References Cited

U.S. PATENT DOCUMENTS

| | | |
|---|---|---|
| 2004/0260549 A1 | 12/2004 | Matsumoto et al. |
| 2013/0085757 A1 | 4/2013 | Nakamura et al. |
| 2014/0172953 A1* | 6/2014 | Blanksteen ....... H04L 29/08936 709/203 |
| 2014/0222436 A1 | 8/2014 | Binder et al. |
| 2016/0098992 A1 | 4/2016 | Renard et al. |
| 2016/0240196 A1 | 8/2016 | Yamashita |
| 2016/0373269 A1 | 12/2016 | Okubo et al. |
| 2017/0025125 A1 | 1/2017 | Alvarez Guevara |
| 2017/0201850 A1* | 7/2017 | Raleigh ................. G06F 3/0482 |
| 2018/0061418 A1* | 3/2018 | Patil ....................... G10L 15/28 |
| 2019/0013019 A1* | 1/2019 | Lawrence ............... G06F 3/167 |

FOREIGN PATENT DOCUMENTS

| | | |
|---|---|---|
| JP | 2015-194766 | 11/2015 |
| JP | 2016-508007 | 3/2016 |
| JP | 2016-057508 | 4/2016 |
| JP | 2016-109784 | 6/2016 |
| JP | 2017-010176 | 1/2017 |
| JP | 2017-027049 | 2/2017 |
| JP | 2017-037176 | 2/2017 |
| KR | 2016/0095418 | 8/2016 |

* cited by examiner

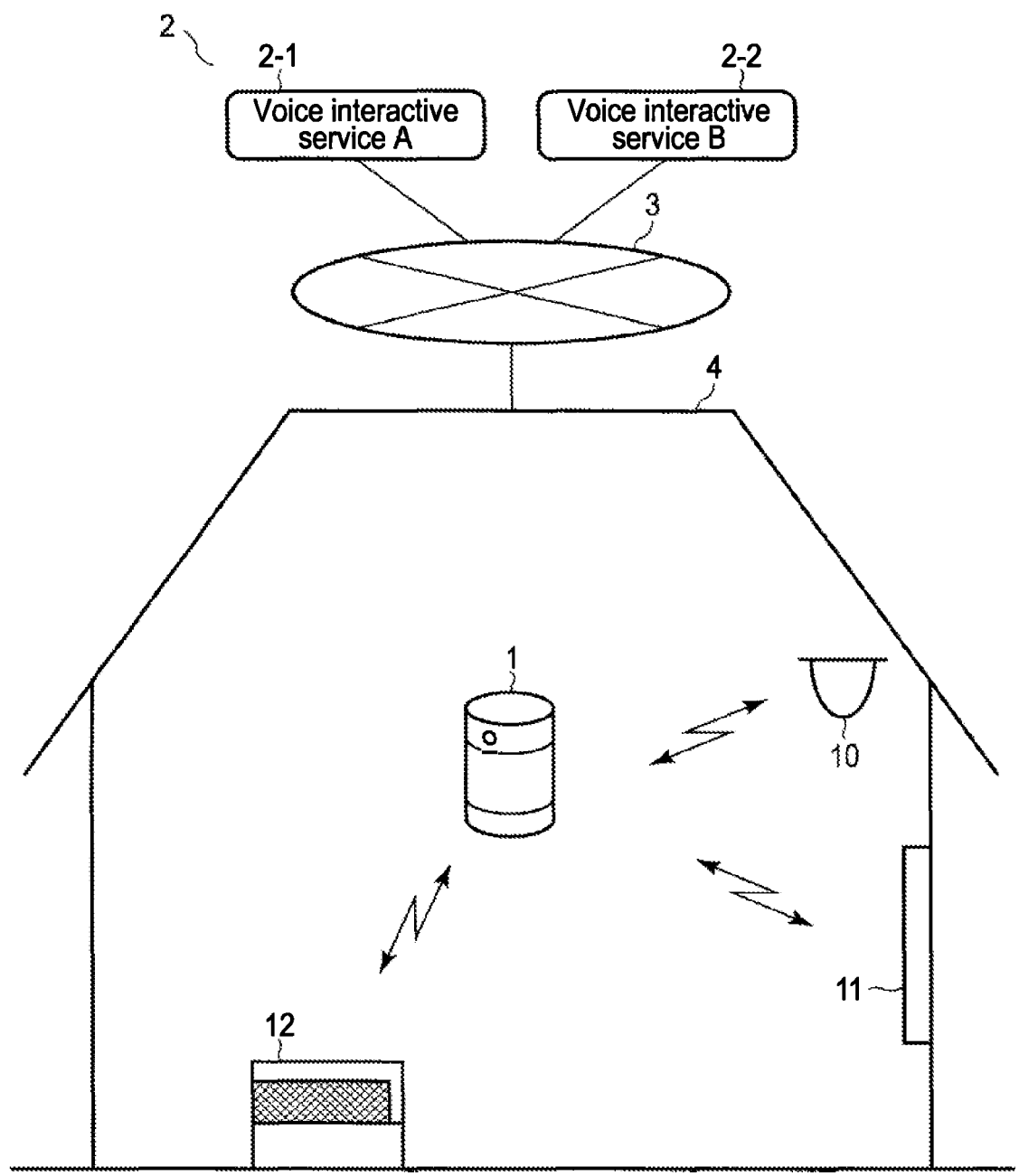
F I G. 1

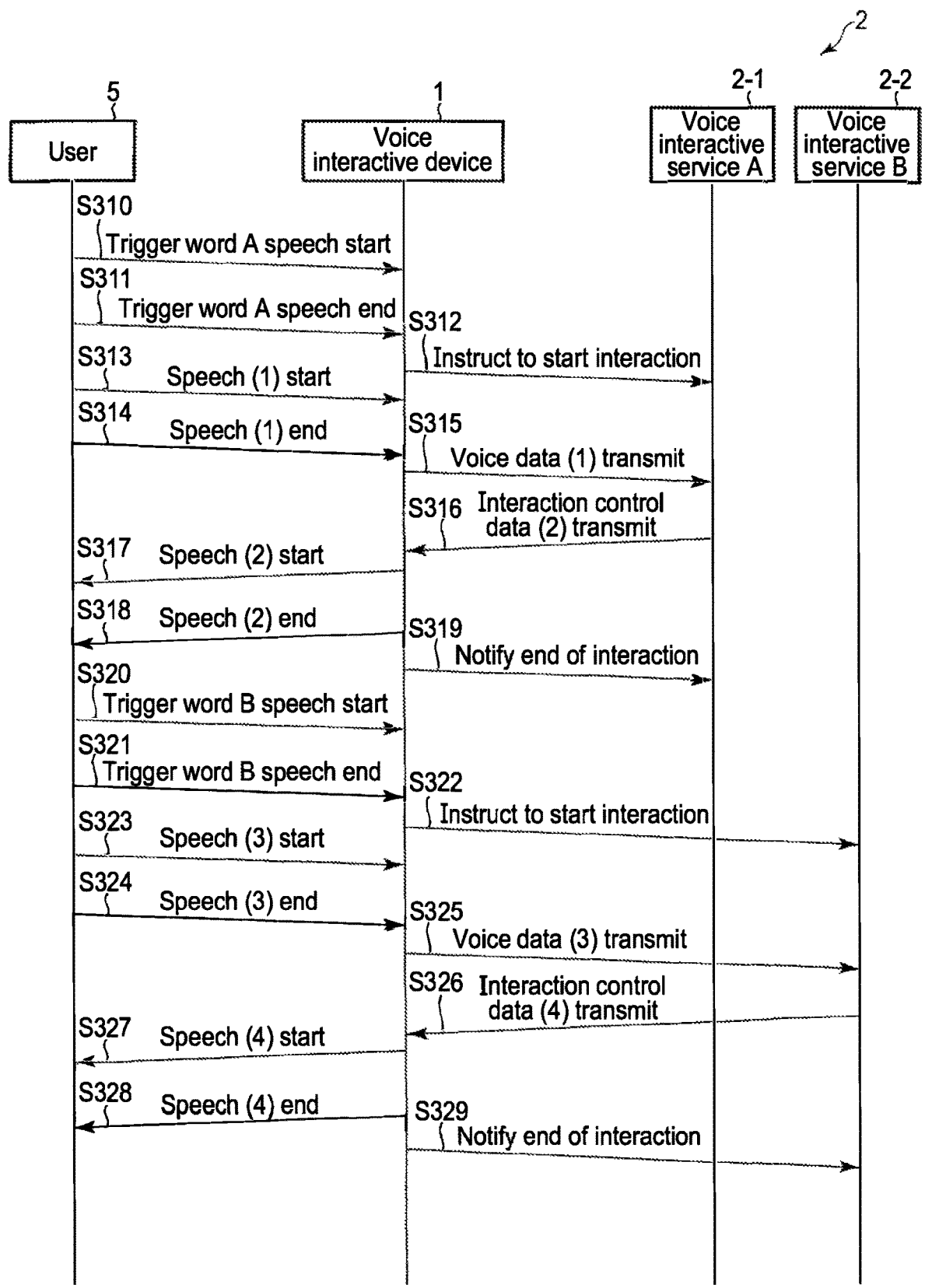
F I G. 3

| Voice interactive service | Trigger word | Use setting |
|---|---|---|
| Voice interactive service A | Trigger word A | Use |
| Voice interactive service B | Trigger word B | Use |
| Voice interactive service C | Trigger word C | Do not use |
| Voice interactive service D | Trigger word D | Use |

FIG. 10

| Voice interactive service | Trigger word | Use setting | Use time |
|---|---|---|---|
| Voice interactive service A | Trigger word A | Use | 06:00~21:00 |
| Voice interactive service B | Trigger word B | Use | 21:00~06:00 |
| Voice interactive service C | Trigger word C | Do not use | NULL |
| Voice interactive service D | Trigger word D | Use | 00:00~24:00 |

| Voice interactive service | Trigger word | Use setting | Use time | In-use display attribution |
|---|---|---|---|---|
| Voice interactive service A | Trigger word A | Use | 06:00~21:00 | LED on |
| Voice interactive service B | Trigger word B | Use | 21:00~06:00 | LED flicker (every 0.2 second) |
| Voice interactive service C | Trigger word C | Do not use | NULL | NULL |
| Voice interactive service D | Trigger word D | Use | 00:00~24:00 | LED flicker (every one second) |

1100 — 1101, 1102, 1103, 1104, 1105

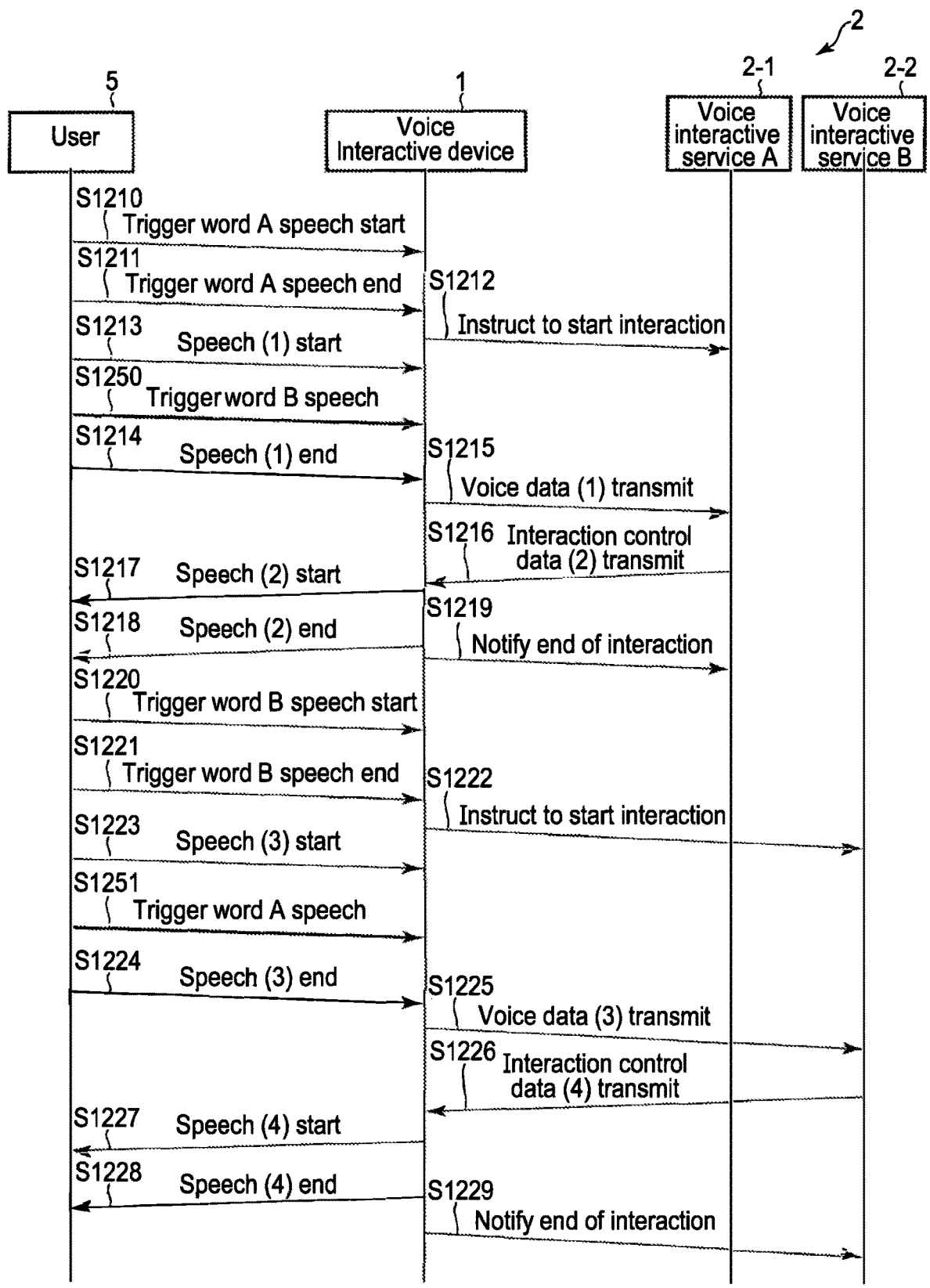
F I G. 12

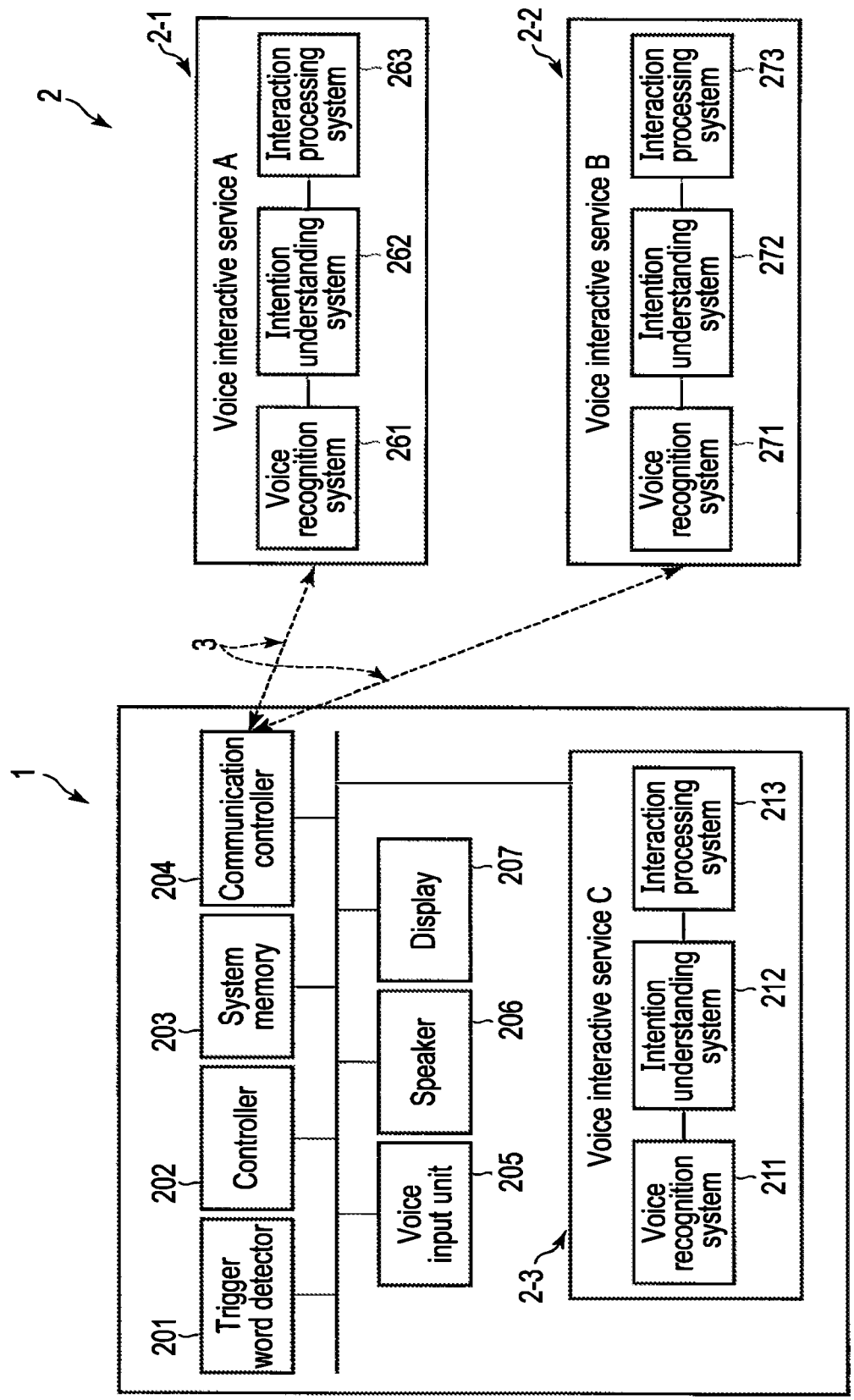
F I G. 15

US 11,302,328 B2

VOICE INTERACTIVE DEVICE AND METHOD FOR CONTROLLING VOICE INTERACTIVE DEVICE

CROSS-REFERENCE TO RELATED APPLICATIONS

This application is a continuation application of and claims benefit of priority from U.S. patent application Ser. No 15/893,509 filed on Feb. 9, 2018, which is based upon and claims the benefit of priority from Japanese Patent Application No. 2017-212851, filed Nov. 2, 2017, the entire contents of which are incorporated herein by reference.

FIELD

Embodiments described herein relate generally to a voice interactive device and a method for controlling voice interactive device.

BACKGROUND

Voice interactive systems are available, and in such a system, a voice uttered by a user is collected by, for example, a microphone, the collected voice is analyzed through a voice recognition process to clarify the contents of the voice, and a service corresponding to the clarified contents is provided to the user. By roughly dividing, the voice interactive system includes two functions; a voice interactive service function and a voice interactive device function.

The voice interactive service function recognizes a voice of a user as an input, clarifies contents of the input, and performs a service corresponding to a result of the clarification. The voice interactive device function inputs a voice content of a user collected by the microphone to the voice interactive service, and outputs a content of the service performed by the voice interactive service to the user and peripheral devices.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 1 shows an outline of a voice interactive system of a first embodiment.

FIG. 3 shows an example of a process sequence in which voice interactive services are used differently depending on trigger words spoken by a user in the voice interactive device and the voice interactive service of FIG. 2.

FIG. 10 is an example of a table of combinations of types of the voice interactive services and trigger words required to use the voice interactive services in a case where the operation screen of FIG. 9 is used.

FIG. 11 is an example of a table of combinations of types of the voice interactive services to which data of each flickering pattern is added and trigger words required to use the voice interactive services, when change the flickering pattern of LED installed in the voice interactive device for each voice interactive service, which is added to the combination table 1000 of FIG. 10.

FIG. 12 shows an example of a process sequence corresponding to the process sequence of FIG. 3 in which a trigger word is included in the speech of user.

FIG. 15 shows an outline of a voice interactive system including a voice interactive device of a fourth embodiment.

DETAILED DESCRIPTION

Figure 2:
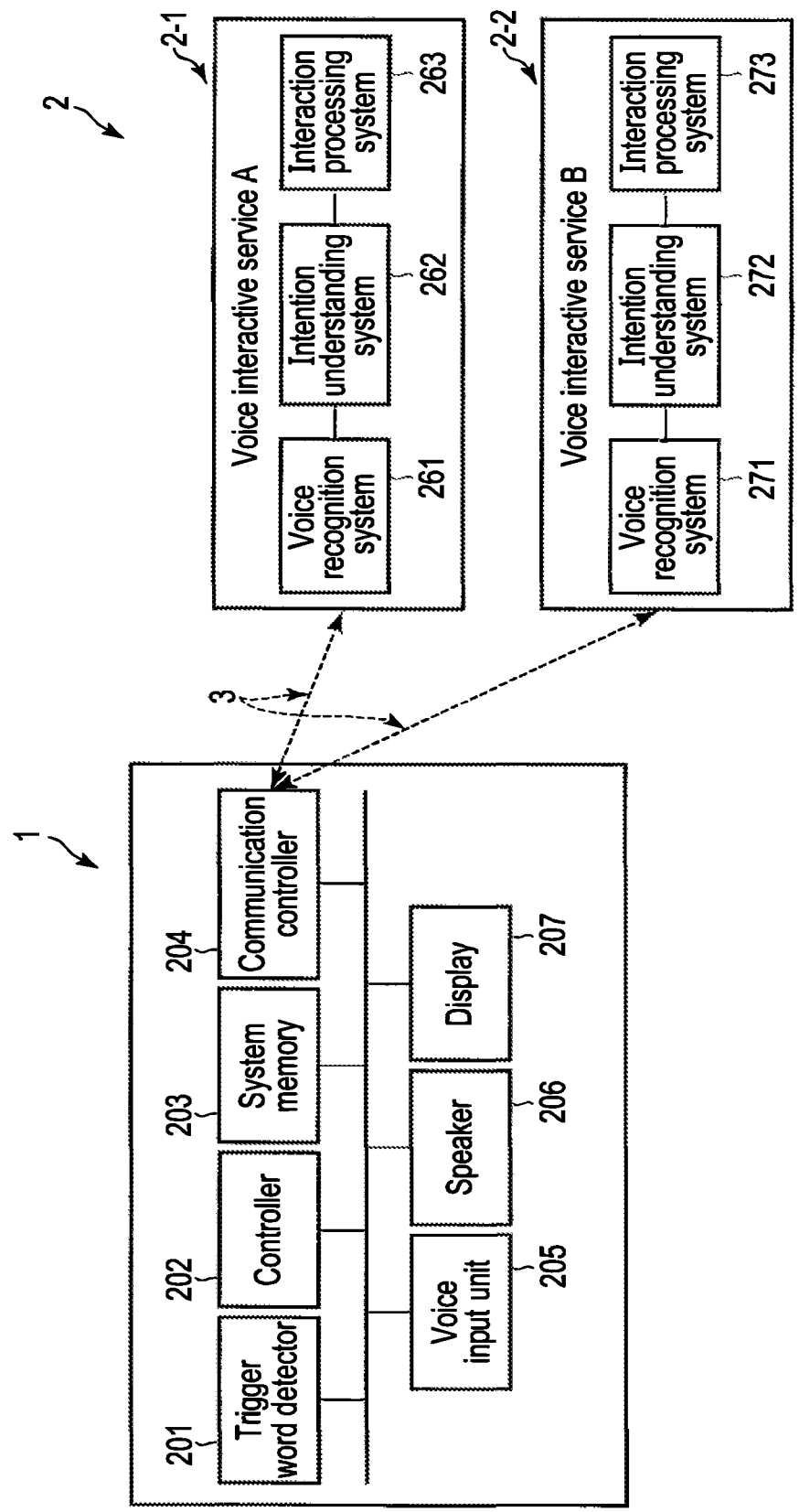
FIG. 2 shows a specific structure of a voice interactive device and voice interactive service of FIG. 1.

Various embodiments will be described hereinafter with reference to the accompanying drawings.

In general, according to one embodiment, a voice interactive device configured to transmit a voice content to a plurality of voice interactive services through a network, wherein the plurality of voice interactive services are selected based at least in part on the voice content, the voice interactive device comprises a keyword detector configured to detect from the voice content a first keyword or a second keyword different from the first keyword, and a controller, wherein the controller transmits at least a first content after the first keyword of the voice content to a first voice interactive service of the voice interactive service when the keyword detector detects the first keyword, and the controller transmits at least a second content after the second keyword of the voice content to a second voice interactive service of the voice interactive services when the keyword detector detects the second keyword.

First Embodiment

A voice interactive device of the first embodiment of the present application includes a function to perform voice interaction with a user using a natural language and to use a voice interactive service associated with a plurality of trigger words registered therein. The voice interactive device of the first embodiment recognizes trigger words associated with a plurality of voice interactive services and changes the setting thereof such that an optional voice interactive service requested by a user can be used. FIG. 1 shows an outline of the voice interactive system including a voice interactive device 1 of the first embodiment. The voice interactive system includes, for example, the voice interactive device 1 provided for a house 4 and a voice interactive service 2 in a cloud network, wherein the voice interactive device 1 and the voice interactive service can communicate through a network 3.

The voice interactive device 1 can communicate with an illumination device 10, air conditioner 11, and video recording/reproducing device 12 in the house 4 through a close-range wireless communication system such as Bluetooth (Registered trademark), ZigBee (Registered trademark), and Wi-Fi. Furthermore, the voice interactive device 1 can control peripheral devices through a communication method which does not require paring such as infrared communication. Furthermore, the voice interactive device 1 can perform communication with electronic devices other than the above-mentioned devices. The voice interactive service 2 includes two interactive services; a voice interactive service A2-1, and a voice interactive service B2-2. Which one of the voice interactive service A2-1 and the voice interactive service B2-2 is used is determined on the basis of a trigger word spoken by a user. A relationship between the trigger words and selection of the voice interactive service A2-1 and the voice interactive service B2-2 of the voice interactive service 2 will be explained later with reference to FIG. 2.

Note that the example of FIG. 1 shows two voice interactive service 2; however, the number of the voice interactive service 2 may be three or more. Furthermore, the voice interactive service A2-1 and the voice interactive service B2-2 of the voice interactive service 2 may be integrated together or may be separated, and if three or more voice interactive services exist, the entire voice interactive services may be integrated together or at least a part thereof may be separated from the others. Here, integration means that services exist in a single server or that services exist in a single service provider.

When a user speaks to the voice interactive device 1, the voice interactive device 1 collects voice data spoken by a user using a microphone provided for the voice interactive device 1 and transmits the voice data to the voice interactive service 2 through the network 3. Upon reception of the voice data from the voice interactive device 1, the voice interactive service 2 analyzes the voice data. The voice interactive service 2 generates a reply corresponding to the analyzed content. The voice interactive service 2 generates the reply and then transmits the reply to the voice interactive device 1 through the network 3.

The reply generated by the voice interactive service 2 includes two types of replies; a voice reply, and a command reply. The voice reply is a reply generated by the voice interactive service 2 on the basis of the voice data input by the voice interactive device 1. The command reply is a command to control an electronic device of the voice interactive device 1 or a peripheral device connected to the voice interactive device 1 through a close-range wireless communication system or the like on the basis of the voice data input by the voice interactive device 1. The electronic device of the voice interactive device 1 is, for example, a camera attached thereto. The peripheral device connected to the voice interactive device 1 through a close-range wireless communication system or the like is, for example, an illumination device 10 or an air conditioner 11.

The content of the voice reply corresponds to the content spoken by the user. For example, if a user's voice content is "Morning" or the like, the reply will be a greeting line such as "Good morning, how are you today?" Or, if a user's voice content is "What time will I arrive Osaka if I take a bullet train now?" or the like, the reply will be an answer such as "If you take a bullet train leaving in 30 minutes from now, you will arrive at Osaka station at approximately 8 p.m."

When the voice interactive device 1 receives a reply from the voice interactive service 2, the voice interactive device 1 outputs, if the reply is a voice data reply, the content of the reply through a speaker attached thereto or the like. Thus, the user can listen to the reply to their speech by the voice interactive system.

The content of the command reply corresponds to a speech of the user to the voice interactive device 1. For example, if a user's speech is "Turn on the air conditioner" or the like, the command will be "Device=air conditioner 11, operation=activate, mode=cooling, setting=temperature 26° C., high power" or the like. Or, if a user's speech is "Turn on the light", the command will be "Device=illumination device 10, operation=activate" or the like.

When the voice interactive device 1 receives a reply from the voice interactive device 1, the voice interactive device 1 controls, if the reply is a command reply, a device to be controlled by the command reply. For example, if the command is "Device=air conditioner 11, operation=activate, mode=cooling, setting=temperature 26° C., high power", the voice interactive device 1 activates the air conditioner 11 with the setting of temperature 26° C. and high power using an internal close-range wireless communication system such as Wi-Fi, ZigBee, or Bluetooth.

If a user's speech to the voice interactive device 1 is, for example, "Play content BBB of streaming service AAA", the command reply may include a command part of "play" and a text data part of "www.AAA.co.jp/musicBBB.wav" converted from the speech of "content BBB of streaming service AAA".

When the voice interactive device 1 receives a reply from the voice interactive service 2, the voice interactive device 1 interprets, if the reply includes a text data part, the text data parts with the command part and controls the device to be controlled. For example, if the command is "play from www.AAA.co.jp/musicBBB.wav", the voice interactive device 1 may acquire data of musicBBB.wav from www.AAA.co.jp and play the acquired data.

FIG. 2 shows specific structure of the voice interactive device 1 and the voice interactive service 2 of FIG. 1. The voice interactive device 1 and the voice interactive service 2 can communicate with each other through the network 3.

The voice interactive device 1 includes a trigger word detector 201, controller 202 which controls the entire voice interactive device, system memory 203 including program, work memory, and the like used for the control of the voice interactive device 1, communication controller 204 used to communicate with the voice interactive service 2 and peripheral devices through the network 3, voice input unit 205 which collects the speech spoken by the user, speaker 206 which outputs a voice data reply, and display 207 which displays a state of the voice interactive device 1, content of a reply, function setting screen by which a function is set, or the like.

The trigger word detector (or keyword detector) 201 is a processor configured to detect a trigger word from the speech spoken by the user.

A trigger word is a certain keyword spoken by a user, by which an interactive process with the voice interactive device 1 is activated. If the voice interactive device 1 detects a trigger word which is a certain keyword spoken by the user by a voice recognition process, the voice interactive device 1 recognizes the speech is made to the voice interactive device 1 and processes the content of the speech after the trigger word as a process target of the voice recognition.

Trigger words to be detected by the trigger word detector 201 are stored in a trigger words storage area(which is not shown) of the system memory 203. The trigger word detector 201 can always detect any of the stored trigger words spoken by users. Furthermore, the trigger word detector 201 notifies detection of the trigger word to the controller 202 only the time when any of the stored trigger words such that the speech content of the user after the trigger word can be processed. Upon reception of the notification, the controller 202 processes the speech content of the user while exchanging data with the voice interactive service 2.

The communication controller 204 is a processor configured to control communication with the voice interactive service 2. The communication controller 204 monitors the communication state with the voice interactive service 2 through the network 3 and notifies whether or not the communication with the voice interactive service 2 can be performed to the controller 202. The communication controller 204 may include a close-range wireless communication system such as Bluetooth, ZigBee, or Wi-Fi or a communication method such as infrared communication.

The voice input unit 205 is a processor configured to collect speech of a user, which is a microphone or the like.

The speaker 206 is a processor configured to, if a voice reply is generated by the voice interactive service 2, output a voice data reply transmitted from the voice interactive service 2. A voice reply may be formed on the basis of text data sent from the voice interactive service 2, and in that case, the speaker 206 receives the text data to convert the text data into voice data using a voice synthesis function and outputs a voice reply.

The voice interactive service 2 includes two types of voice interactive services including the voice interactive service A2-1 and the voice interactive service B2-2. The voice interactive service A2-1 includes a voice recognition system 261 which recognizes the voice data transmitted from the voice interactive device 1 to convert the voice data into a speech text, speech intention understanding system 262 which understands the intention of the speech of the user from the speech text, and interaction processing system 263 which generates a reply to the user speech content understood by the speech intention understanding system 262.

The voice interactive service B2-2 includes, as in the voice interactive service A2-1, a voice recognition system 271 which converts the voice data transmitted from the voice interactive device 1, speech intention understanding system 272 which understands the intention of a character string which is text data converted from the voice data, and interaction processing system 273 which generates a reply to the user speech content understood by the speech intention understanding system 272.

Each of the voice interactive service A2-1 and the voice interactive service B2-2 has unique special characteristics of voice interactive service and has different special fields (electricity, medical, agriculture, sports, etc.) therein.

FIG. 3 shows an example of a process sequence where the voice interactive service A2-1 and the voice interactive service B2-2 are used differently as the voice interactive device 1 depending on the trigger words by a user 5 in the voice interactive device 1 and the voice interactive service 2 of FIG. 2. Note that, if the voice interactive device 1 determines that a trigger word spoken by the user 5 is a trigger word A, the voice interactive service A2-1 is preliminarily set to generate a reply to the speech of the user 5. Furthermore, if the voice interactive service 1 determines that a trigger word spoken by the user 5 is a trigger word B, the voice interactive service B2-2 is preliminarily set to generate a reply to the speech of the user 5.

When user 5 speaks (S310 and S311), the voice input unit 205 of the voice interactive device 1 collects the speech of user 5 and sent the collected speech as voice data to the trigger word detector 201. The trigger word detector 201 determines whether or not the voce data transmitted from the voice input unit 205 match a trigger word preliminarily stored in the system memory 203 by a voice recognition process.

If a result of determination shows that the speech of user 5 in S310 and S311 is the trigger word A, the voice interactive device 1 issues interaction initialization instruction to the voice interactive service A2-1 (S312). Upon reception of the interaction initialization instruction (S312), the voice interactive service A2-1 becomes ready to analyze the following voice data transmitted from the voice interactive device 1.

User 5 then continues to speak to the voice interactive device 1 after S310 and S311 (S313 and S314). If the voice interactive device 1 collecting the speech of user 5 recognizes that a series of speech of user 5 ends, the voice interactive device 1 then transmits the collected speech to the voice interactive service A2-1 as voice data (S315). Note that, even in the middle of the speech of user 5, the voice interactive device 1 may transmit the speech content collected until then to the voice interactive service A2-1.

Furthermore, the voice data transmitted to the voice interactive service A2-1 by the voice interactive device 1 in S315 may be the voice data of speech of user 5 between S313 and S314 or may be the voice data including the trigger word A between S310 and S311. Or, the transmitted voice data may be voice data within an optional part between S310 and S314.

Upon reception of the voice data from the voice interactive device 1, the voice interactive service A2-1 analyzes the received voice data and generates a reply corresponding to the result of analysis. Upon completion of the generation of reply, the voice interactive service A2-1 transmits the generated reply to the voice interactive device 1 (S316).

Upon reception of the reply from the voice interactive service A2-1, the voice interactive device 1 performs an operation on the basis of the reply. In the example of FIG. 3, the reply generated by the voice interactive service A2-1 is a voice data reply. Upon reception of the voice data reply, the voice interactive device 1 outputs the reply as speech through the speaker 206 (S317 and S318).

Upon completion of the output of reply, the voice interactive device 1 transmits an interaction end notification to the voice interactive service A2-1 (S319).

When user 5 further speaks (S320 and S321), the voice input unit 205 of the voice interactive device 1 collects the speech of user 5 and transmits the speech to the trigger word detector 201 as voice data. The trigger word detector 201 determines whether or not the voce data transmitted from the voice input unit 205 match a trigger word preliminarily stored in the system memory 203 by a voice recognition process.

If a result of determination shows that the speech of user 5 in S320 and S321 is the trigger word B, the voice interactive device 1 issues interaction initialization instruction to the voice interactive service B2-2 (S322). Upon reception of the interaction initialization instruction (S322), the voice interactive service B2-2 becomes ready to analyze the following voice data transmitted from the voice interactive device 1.

User 5 then continues to speak to the voice interactive device 1 after S320 and S321 (S323 and S324). If the voice interactive device 1 collecting the speech of user 5 recognizes that a series of speech of user 5 ends, the voice interactive device 1 then transmits the collected speech to the voice interactive service B2-2 as voice data (S325). Note that, even in the middle of the speech of user 5, the voice interactive device 1 may transmit the speech content collected until then to the voice interactive service B2-2.

Furthermore, the voice data transmitted to the voice interactive service B2-2 by the voice interactive device 1 in S325 may be the voice data of speech of user 5 between S323 and S324 or may be the voice data including the trigger word B between S320 and S321. Or, the transmitted voice data may be voice data within an optional part between S320 and S324.

Upon reception of the voice data from the voice interactive device 1, the voice interactive service B2-2 analyzes the received voice data and generates a reply corresponding to the result of analysis. Upon completion of the generation of reply, the voice interactive service B2-2 transmits the generated reply to the voice interactive device 1 (S326).

Upon reception of the reply from the voice interactive service B2-2, the voice interactive device 1 performs an operation on the basis of the reply. In the example of FIG. 3, the reply generated by the voice interactive service B2-2 is a voice data reply. Upon reception of the voice data reply, the voice interactive device 1 outputs the reply as speech through the speaker 206 (S327 and S328).

Upon completion of the output of reply, the voice interactive device 1 transmits an interaction end notification to the voice interactive service B2-2 (S329).

As can be understood from the above, the voice interactive device 1 can automatically switch the voice interactive service 2 depending on the trigger words spoken by user 5. Thus, the voice interactive device 1 can switch the voice interactive service 2 to satisfy the request of user 5. Furthermore, data used by the voice interactive device 1 to switch the voice interactive service 2 are trigger words spoken by user 5. That is, user 5 can perform switching of the voice interactive service 2 by simply speaking trigger words. Thus, usage of the voice interactive device 1 by user 5 can be improved.

Note that the sequence of FIG. 3 is a case where the number of voice interactive service 2 used by the voice interactive device 1 is two; however, the number of the voice interactive service 2 used by the voice interactive device 1 may be three or more.

As in the sequence of FIG. 3, the voice interactive device 1 can switch the voice interactive service 2 corresponding to trigger words spoken by user 5. Now, a process flow of switching the voice interactive service 2 by the voice interactive device 1 will be explained in detail.

Figure 4:
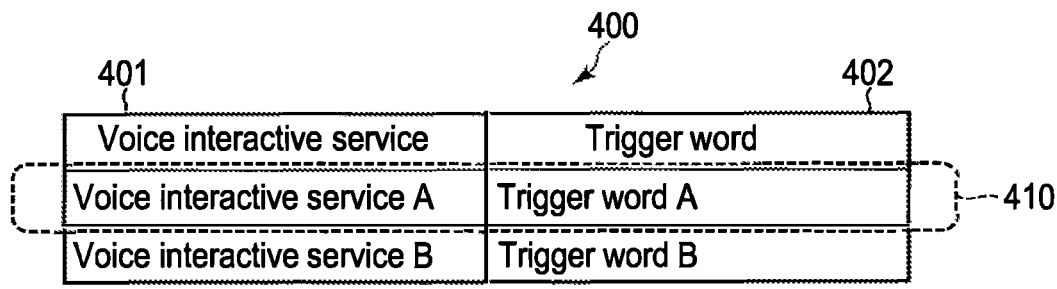
FIG. 4 shows a table showing combinations of types of the voice interactive services used by the voice interactive device and trigger words required to use the voice interactive services stored in a system memory.

FIG. 4 shows a table 400 showing combinations of types of the voice interactive service 2 used by the voice interactive device 1 and trigger words required to use the voice interactive service 2 stored in the system memory 203.

The table 400 of possible combinations includes a line 401 showing the types of voice interactive service 2 and a line 402 showing the types of trigger words required to use the voice interactive service 2. For example, a combination 410 shows that the voice interactive service A2-1 is used when the voice interactive device 1 determines that the trigger word spoken by user 5 is trigger word A. The table 400 of possible combinations is stored in the trigger words storage area(which is not shown) of the system memory 203. Note that, in this example, the voice interactive service 2 written in the line 401 indicate all types of voice interactive service 2 used by the voice interactive device 1.

Figure 5:
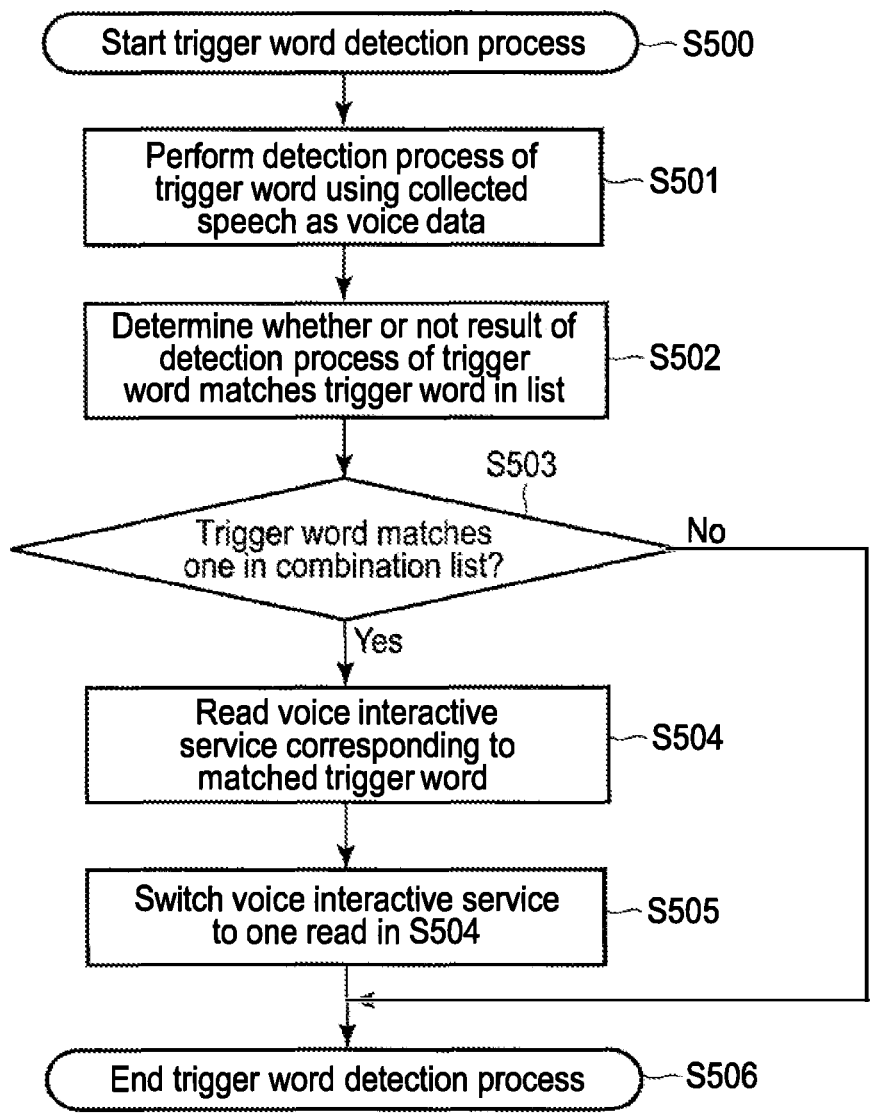
FIG. 5 shows a process flow of switching the voice interactive services by the voice interactive device corresponding to a trigger word spoken by a user in a case where the table showing combinations of the types of voice interactive services and the trigger words required to use the voice interactive services is stored in the system memory of FIG. 4.

FIG. 5 shows a process flow of switching the voice interactive service 2 by the voice interactive device 1 corresponding to a trigger word spoken by user 5 in a case where the table 400 showing combinations of the types of voice interactive service 2 and the trigger words required to use the voice interactive service 2 is stored in the system memory 203 of FIG. 4.

Upon collection of a speech spoken by user 5, the voice interactive device 1 initiates a trigger word detection process which detects a trigger word from the collected speech and selects a corresponding voice interactive service 2 (S500).

Upon collection of the speech spoken by user 5, the voice input unit 205 of the voice interactive device 1 transmits the collected speech to the trigger word detector 201 as voice data. Upon reception of the voice data transmitted from the voice input unit 205, the trigger word detector 201 performs voice recognition of the received voice data by a voice recognition process (S501).

The trigger word detector 201 determines whether or not a result of the voice recognition process of the received voice data matches a trigger word in the combination table of FIG. 4 (S502).

If a result of determination matches a trigger word in the combination table (Yes in S503), the trigger word detector 201 reads the voice interactive service 401 corresponding to the trigger word in the combination table (S504). The trigger word detector 201 notifies the voice interactive service 401 read in S504 to the controller 202. The controller 202 switches the voice interactive service to the notified voice interactive service 401 in order to generate a reply to the following speech of user 5 (S505). Upon completion of the process of switching the voice interactive service to the notified voice interactive service 401, the controller ends the trigger word detection process (S506).

If a result of determination does not match a trigger word in the combination table (No in S503), the trigger word detector 201 ends the trigger word detection process without switching the voice interactive service (S506).

Furthermore, the voice interactive device 1 of the first embodiment may be set by a user such that only a part of the voice interactive services in the entire voice interactive service 2 can be used.

Figures 6, 7:
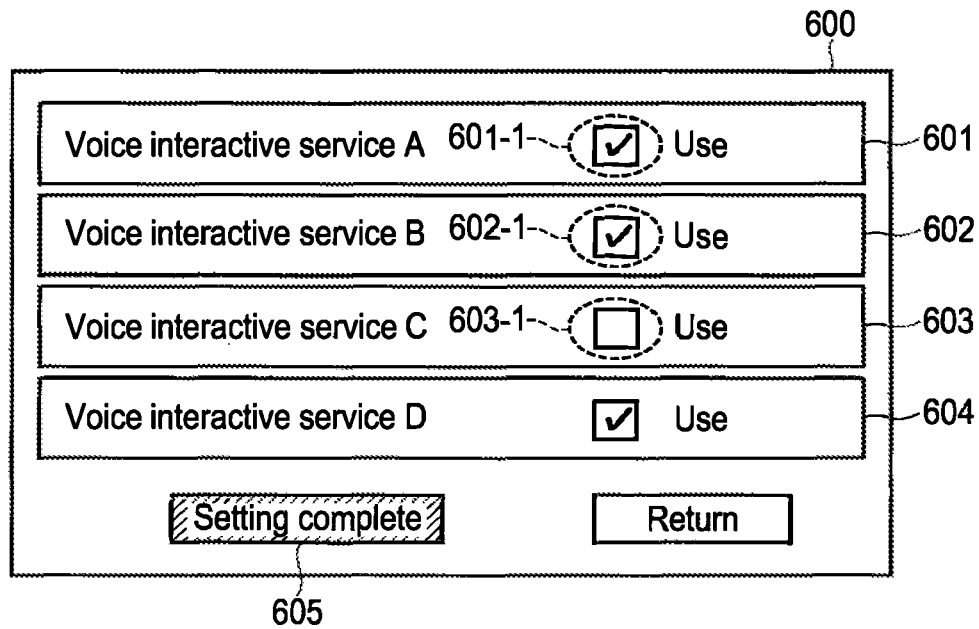
FIG. 6 shows an example of a display of operation screen by which a user set voice interactive services used by the voice interactive device from the entire voice interactive services.
FIG. 7 shows a table showing combinations of types of the voice interactive services used by the voice interactive device and trigger words required to use the voice interactive services in a case where the voice interactive services actually used by the voice interactive device can be set by a user operation as in FIG. 6.

FIG. 6 shows an example of a display of operation screen 600 by which a user set voice interactive services used by the voice interactive device 1 from the entire voice interactive services. In the example of FIG. 6, the voice interactive services used by the voice interactive device 1 include four voice interactive services A to D. The operation screen 600 is displayed in the display 207 of FIG. 2.

User 5 can select a voice interactive service to be actually used from the voice interactive services A to D by, for example, a touch operation of operation screen 600. User 5 can set use/no-use of a voice interactive service by touching a check box in the left side of indication "use" which is, for example, check box 601-1.

In the example of FIG. 6, an indication 601 shows check box 601-1 is checked. This means that user 5 chooses to use the voice interactive service A. Similarly, an indication 602 shows that user 5 chooses to use the voice interactive service B. An indication 603 shows that check box 603-1 is not checked. This means that user 5 does not choose to use the voice interactive service C.

After setting use/no-use of each voice interactive service by touching each check box, user 5 can store the setting of use/no-use of each voice interactive service in the voice interactive device 1 by touching a setting completion 605.

Since the user setting is allowed as above, the voice interactive services preferred by user 5 can be chosen from the entire voice interactive service 2 to be used by the voice interactive device 1. Thus, the usage of the voice interactive device 1 by user 5 can further be improved.

FIG. 7 shows a table 700 showing combinations of types of the voice interactive service 2 used by the voice interactive device 1 and trigger words required to use the voice interactive service 2 in a case where the voice interactive services actually used by the voice interactive device 1 can be set by a user operation as in FIG. 6. The table 700 of FIG. 7 includes a line of use setting 703 which is not adopted in the table 400 of FIG. 4.

Figure 8:
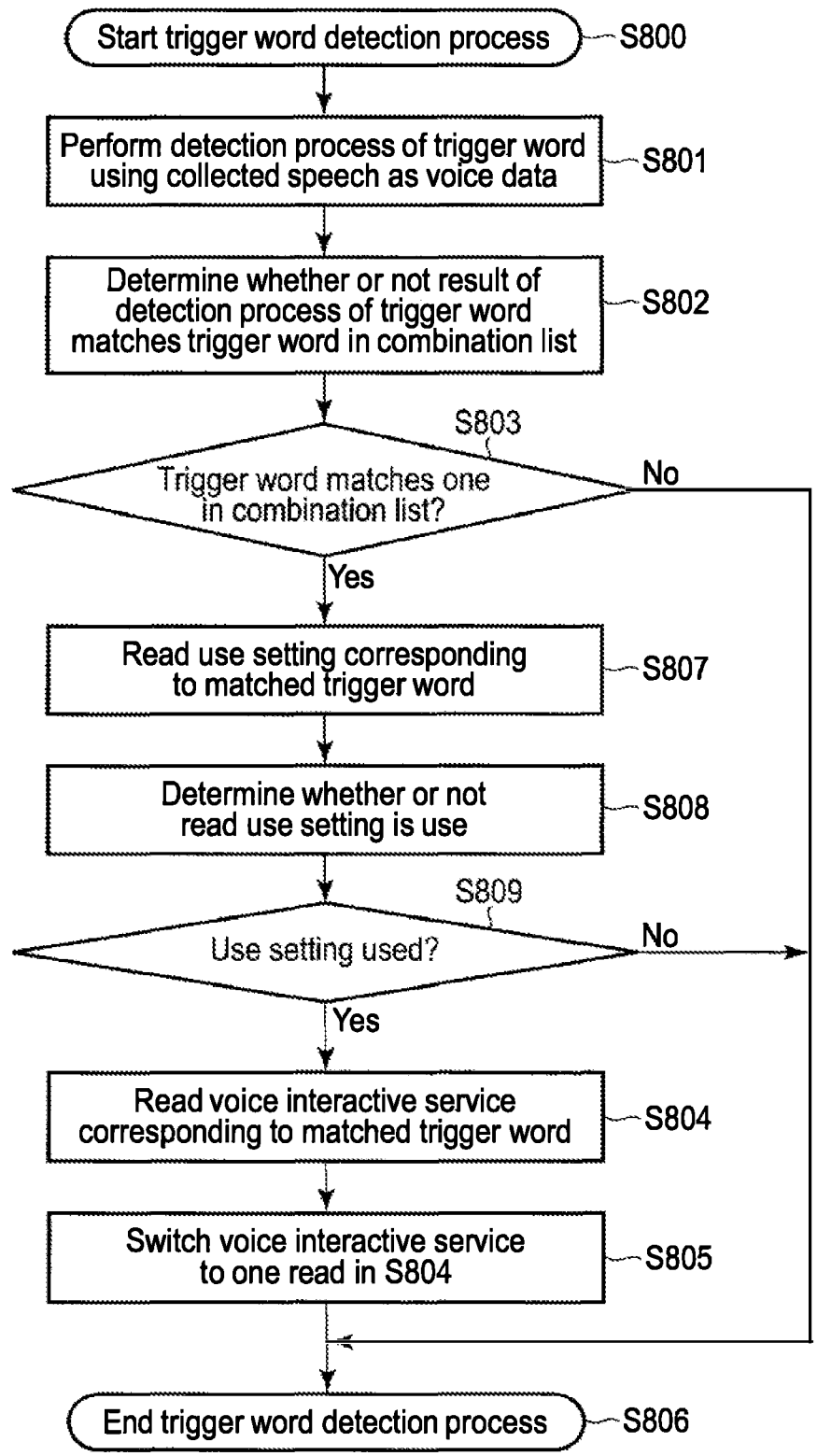
FIG. 8 is a process flow of switching the voice interactive services by the voice interactive device corresponding to a trigger word spoken by user in a case where the combination table is stored in the system memory as in FIG. 7.

FIG. 8 is a process flow of switching the voice interactive service 2 by the voice interactive device 1 corresponding to a trigger word spoken by user 5 in a case where the combination table 700 is stored in the system memory 203 as in FIG. 7. The process flow of FIG. 8 includes steps S807, S808, and S809 which are not adopted in the process flow of FIG. 5. Steps of S800 to S806 of FIG. 8 correspond to the steps S500 to S506.

The trigger word detector 201 determines whether or not a result of the voice recognition process of the received voice data matches a trigger word in the combination table of FIG. 7 match (S802).

If a result of determination shows that there is a matched trigger word in the combination table (Yes in S803), the trigger word detector 201 reads use setting corresponding to the matched trigger word from the combination table (S807). The trigger word detector 201 determines whether or not the read use setting is use (S808).

If a result of the determination shows that use setting is use (Yes in S809), the trigger word detector 201 reads a voice interactive service corresponding to the matched trigger word from the combination table in step S803 (S804). Thereafter, as in the steps of FIG. 5, the voice interactive service 2 is switched.

If a result of the determination shows that use setting is no-use (No in S809), the trigger word detector 201 ends the trigger word detection process without switching the used voice interactive service 2 (S806).

Furthermore, the voice interactive device 1 of the first embodiment may be set to determine an available time of each of the voice interactive service 2.

Figure 9:
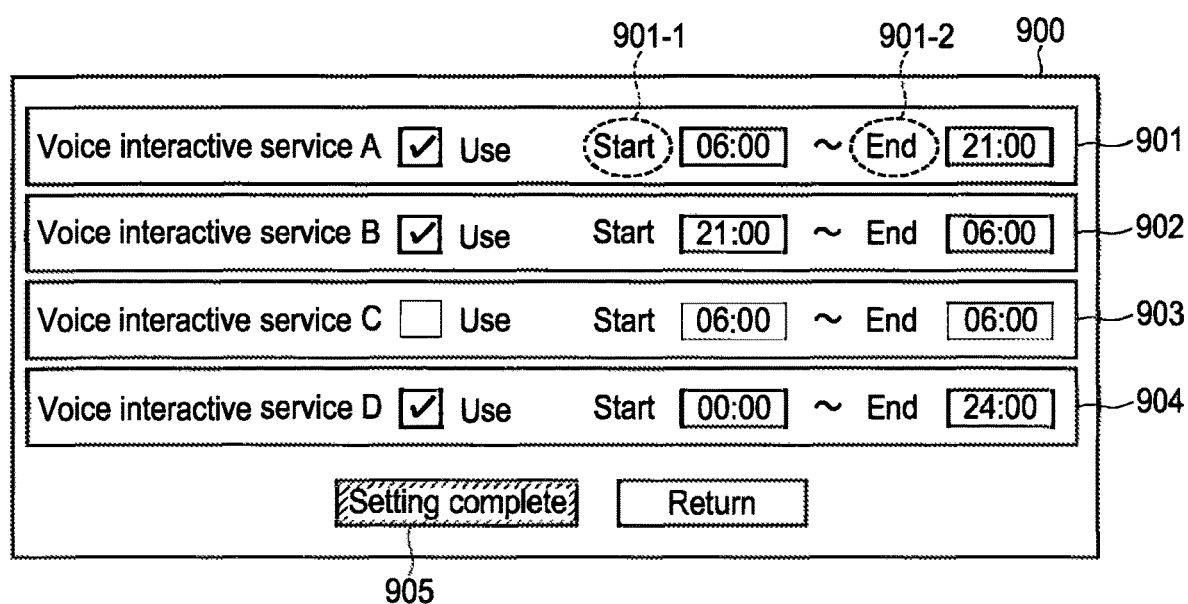
FIG. 9 shows an example of an operation screen in which a period of time (start time and end time) when each voice interactive service can be used is set, which is added to the operation screen of FIG. 6.

FIG. 9 shows an example of an operation screen 900 in which a period of time (start time and end time) when each voice interactive service can be used is set, which is added to the operation screen 600 of FIG. 6.

In FIG. 9, indication 901 shows that the voice interactive service A can be used between 06:00 set as start 901-1 and 21:00 set as end 901-2.

FIG. 10 is an example of a table 1000 of combinations of types of the voice interactive services and trigger words required to use the voice interactive service 2 in a case where the operation screen 900 of FIG. 9 is used.

The table 1000 of FIG. 10 includes a line of available time 1004 which is not adopted in the table 700 of FIG. 7.

The voice interactive device 1 refers to the available time 1004 in the combination table 1000 before performing the step S804 in the trigger word detection process of FIG. 8 in order to determine whether or not the voice interactive service 2 to be used is available or not.

Furthermore, in order to notify which voice interactive service is currently used to user 5, the voice interactive device 1 may perform the followings:

Change a color of LED of the voice interactive device 1;

Change flicker pattern of LED of the voice interactive device 1;

Turn on LED set for each voice interactive service of the voice interactive device 1;

Change title, icon, or character of each voice interactive service displayed on a display screen of the display 207 of the voice interactive device 1;

Change title, icon, or character of each voice interactive service output by a projector (which is not shown) of the voice interactive device 1;

Change title, icon, or character of each voice interactive service displayed by a hologram display (which is not shown) of the voice interactive device 1;

Change utterance type when a voice data reply generated by the voice interactive service is output from the speaker 206;

Change certain utterance types output from the speaker 206 of the voice interactive device 1; and Announce the voice interactive service currently used when the voice interactive device 1 starts to use the voice interactive service.

The voice interactive device 1 may perform one of the above (1) to (9) or perform an optional combination of (1) to (9).

FIG. 11 is an example of a table 1100 of combinations of types of the voice interactive services and trigger words required to use the voice interactive services including an in-use state display attribution 1105, which is added to the operation screen 1000 of FIG. 10. The in-use display attribution 1105 of FIG. 11 shows a case where the above (2) in which the flicker pattern of LED of the voice interactive device 1 is changed with each voice interactive service.

The combination table 1100 FIG. 11 includes a line of in-use display attribution 1105 is added, which is different from the combination table 1000 of FIG. 10.

The voice interactive device 1 determines the voice interactive service 2 to be used on the basis of the data including trigger word 1102, use setting 1103, available time 1104 in the combination table 1100 of FIG. 11 stored in the system memory 203. Upon determination of the voice interactive service to be used, the voice interactive device 1 refers to the data of in-use display attribution 1105 corresponding to the voice interactive service determined to show that the voice interactive service is in-use.

Second Embodiment

A voice interactive device of the second embodiment includes a function to perform voice interaction with a user using a natural language and to use a voice interactive service associated with a plurality of trigger words registered therein. While performing an interaction process with a voice interactive service, the voice interactive device of the second embodiment detects a trigger word different from the trigger word associated with the currently-used voice interactive service, the voice interactive device continues the interaction process with the currently-used voice interactive service. The voice interactive device of the second embodiment processes the newly detected trigger word as a content of speech with respect to the currently-used voice interactive service.

FIG. 12 shows an example of a process sequence corresponding to the process sequence of FIG. 3 in which a trigger word is included in the speech of user 5.

Steps S1210 to S1229 of FIG. 12 correspond to steps S310 to S329 of FIG. 3. As compared to the process sequence of FIG. 3, the process sequence of FIG. 12 includes a step (S1250) in which a trigger word B is spoken by user 5 between a start of speech 1 (S1213) and an end of speech 1 (S1214), and a step (S1251) in which a trigger word B is spoken by user 5 between a start of speech 3 (S1223) and an end of speech 3 (S1224).

As shown in FIG. 12, even if user 5 speaks the trigger word B in S1250, the voice interactive device 1 performing the voice interactive service A2-1 corresponding to the trigger word A does not switch the voice interactive service A2-1 to the voice interactive service B2-2 corresponding to the received trigger word B (S1250). Similarly, even if user 5 speaks the trigger word A in S1251, the voice interactive device 1 performing the voice interactive service B2-2 does not switch the voice interactive service B2-2 to the voice interactive service A2-1 corresponding to the received trigger word A (S1251).

The voice interactive device 1 does not recognize the trigger word B spoken by user 5 in S1250 as a trigger word but as a simple word in the speech between the start of speech 1 (S1213) and the end of speech 1 (S1214), and the whole speech is transmitted to the voice interactive service 2. Similarly, the voice interactive device 1 does not recognizes the trigger word A spoken by user 5 in S1251 as a trigger word but as a simple word in the speech between the start of speech 3 (S1223) and the end of speech 3 (S1224), and the whole speech is transmitted to the voice interactive service 2.

As shown in FIG. 12, in order to stop switching the voice interactive service A2-1 to the voice interactive service B2-2 even if a trigger word B received while performing the voice interactive service A2-1 with respect to the trigger word A, the voice interactive device 1 is set to manage the process state.

Figure 13:
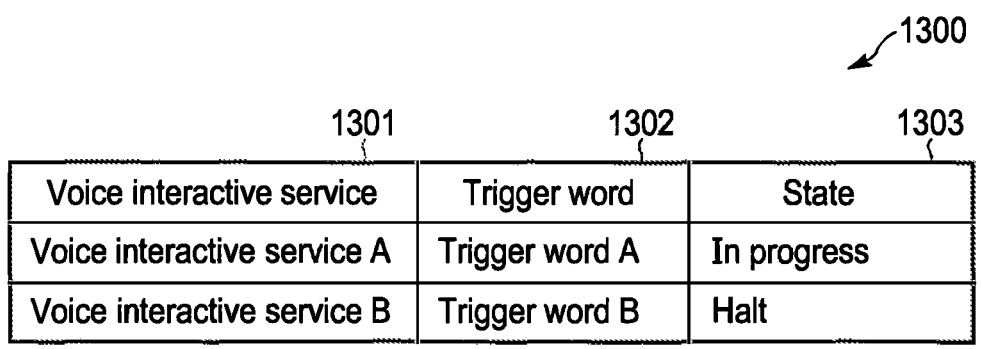
FIG. 13 shows an example of a table of combinations of types of the voice interactive services and trigger words required to use the voice interactive services in which the voice interactive device can manage the state of the process corresponding to a received trigger word.

FIG. 13 is an example of a table 1300 of combinations of types of the voice interactive service 2 and trigger words required to use the voice interactive services in which the voice interactive device 1 can manage the state of the process corresponding to a received trigger word. The combination table 1300 of FIG. 13 includes a line of state 1303 which is different from the combination table 400 of FIG. 4.

For example, in the process sequence of FIG. 12, if the voice interactive device 1 recognizes the trigger word A in the speech S1210 to S1211, the voice interactive device 1 may start the voice interactive service A2-1 in response to the recognized trigger word A and set the state 1303 of the voice interactive service A2-1 to "execution". Furthermore, in the process sequence of FIG. 12, if the voice interactive device 1 completes replies S1217 to S1218 in response to the speech S1213 to S1214 of user 5, the voice interactive device 1 may determine that the voice interactive service A2-1 currently performed is finished and set the state 1303 of the voice interactive service A2-1 to "halt". A time to set the state 1303 of the voice interactive service A2-1 to "halt" by the voice interactive device 1 may be a time when the end of speech of user 5 is recognized in S1214, or may be a time when a reply S1217 is transmitted in response to the speech S1213 to S1214 of user 5.

The example of the combination table 1300 of FIG. 13 shows a case where the voice interactive device 1 recognizes a trigger word in the speech of S1210 to S1211 of user 5. Since the voice interactive device 1 completes the recognition of the trigger word with respect to the speech S1210 to S1211 of user 5, the state 1303 of the combination table 1300 shows that the voice interactive service A2-1 is in "execution" and the voice interactive service B2-2 is in "halt".

Upon recognition of a trigger word from the speech of user 5, the voice interactive device 1 refers to the state 1303 in the combination table 1300 stored in the system memory 203 to determine whether or not there is a state 1303 in "execution".

A result of determination shows that there is a state 1303 in "execution", the voice interactive device 1 determines that a voice interactive service 2 is already performed, and does not switch the voice interactive service 2 even if a trigger word is recognized from the speech of user 5.

A result of determination shows that there is not a state 1303 in "execution", that is, a state 1303 is in "halt", the voice interactive device 1 determines that the voice interactive service 2 is not performed and starts the voice interactive service 2 corresponding to the recognized trigger word.

As can be understood form the above, the voice interactive device 1 manages the state to perform switching/non switching of the voice interactive service 2 corresponding to the recognized trigger word.

Thus, an unintentional switching of the voice interactive service 2 caused by recognizing an odd trigger word in the content of speech of user 5 can be prevented.

Furthermore, as in the first embodiment, the voice interactive device 1 of the second embodiment may be set to determine whether or not each of the voice interactive service 2 is used. Furthermore, an available time of the voice interactive service 2 may be set. Furthermore, the display may be changed such that user 5 can recognize which voice interactive service 2 is currently used.

Third Embodiment

A voice interactive device of the third embodiment includes a function to perform voice interaction with a user using a natural language and to use a voice interactive service associated with a plurality of trigger words registered therein. If the voice interactive device of the second embodiment detects a trigger word which is different from the trigger word associated with the currently-performed voice interactive service while performing an interaction process with respect to the currently-performed voice interactive service, the voice interactive device of the second embodiment halts the interaction process with respect to the currently-performed voice interactive service. The voice interactive device of the third embodiment switches to an interaction process of the voice interactive service associated with a trigger word for a halt process.

Figure 14:
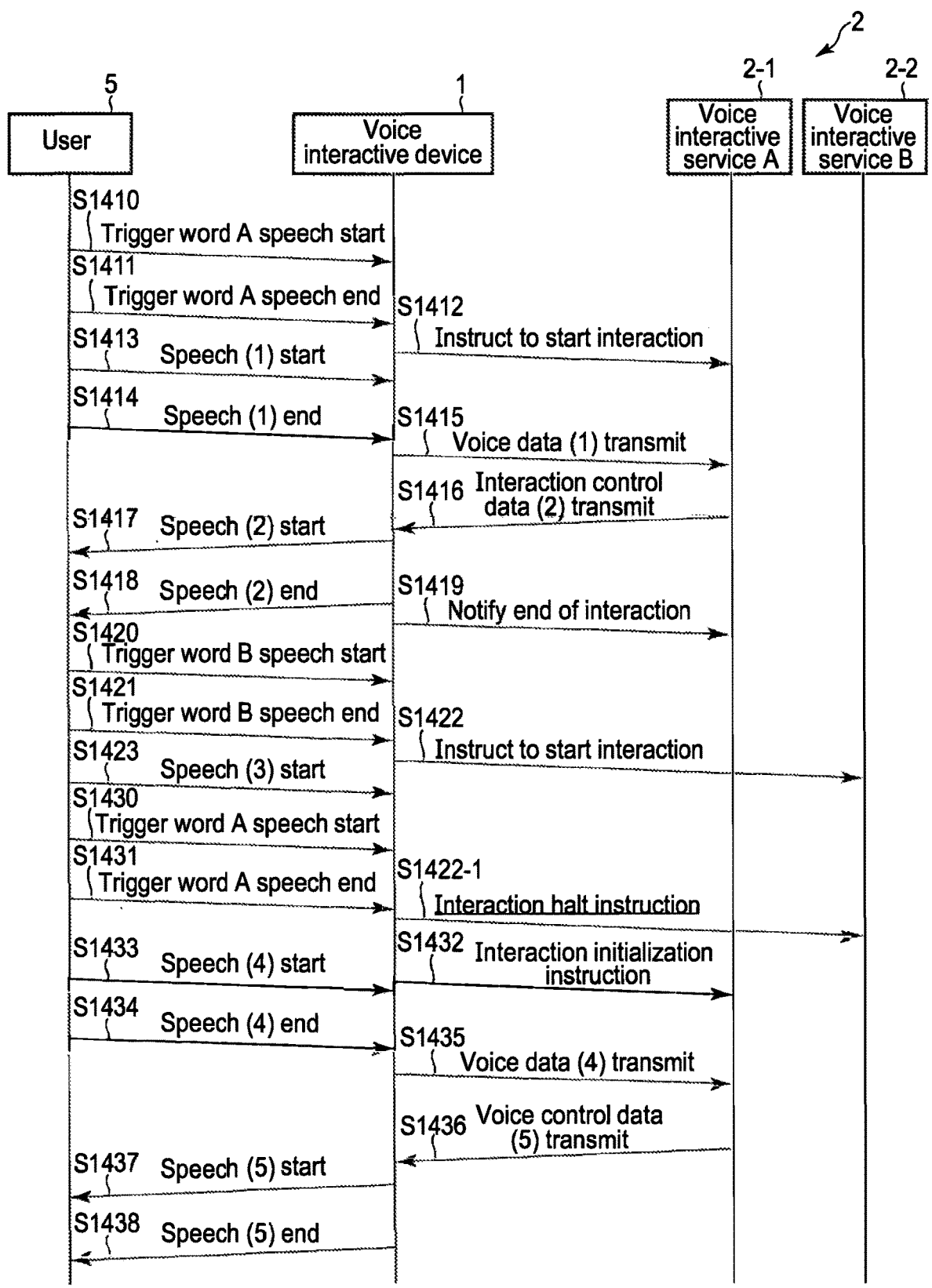
FIG. 14 shows an example of a process sequence in which, if a trigger word is detected while performing an interaction process with respect to the currently-performed voice interactive service, and the trigger word is different from the trigger word associated with the currently-performed voice interactive service, the interaction process with respect to the currently-performed voice interactive service is halted and switched to an interaction process with respect to the voice interactive service associated with the trigger word for a halt process.

FIG. 14 shows an example of a process sequence in which, if a trigger word is detected while performing an interaction process with respect to the currently-performed voice interactive service 2, and the trigger word is different from the trigger word associated with the currently-performed voice interactive service 2, the interaction process with respect to the currently-performed voice interactive service 2 is halted and switched to an interaction process with respect to the voice interactive service 2 associated with the trigger word for a halt process.

Steps S1410 to S1423 of FIG. 14 are the same as steps S310 to S323. User 5 speaks a trigger word A in speech S1423 (S1430 and S1431). If the voice interactive device 1 recognizes the trigger word A in the speech S1423 of user 5, transmits an interaction halt instruction to the voice interactive service B2-2 in order to halt the voice interactive service B2-2 currently performed and to perform the voice interactive service A2-1 (S1422-1). Then, the voice interactive device 1 transmits the interaction initialization instruction to the voice interactive service A2-1 corresponding to the trigger word A recognized in the speech S1423 of user 5 (S1432). Then, the voice interactive device 1 transmits the following content (S1433 and S1434) of speech of user 5 to the voice interactive service A2-1 (S1435), and outputs a reply transmitted from the voice interactive service A2-1 (S1436) as a voice data reply form the speaker 206 (S1437 and S1438).

Note that the voice data transmitted by the voice interactive device 1 to the voice interactive service A2-1 in S1435 may be the voice data of speech of user between S1433 and S1434 or may be the voice data including the trigger word A between S1430 and 1431, or may be voice data of speech in an optional part between S1430 and S1434.

As can be understood from the above, the voice interactive device 1 of the third embodiment can switch to the voice interactive service 2 corresponding to a trigger word recognized at optional timing.

Furthermore, as in the first embodiment, the voice interactive device 1 of the third embodiment may be set to determine whether or not each of the voice interactive services is used. Furthermore, an available time of the voice interactive service may be set. Furthermore, the display may be changed such that user 5 can recognize which voice interactive service is currently used.

Fourth Embodiment

A voice interactive device 1 of the fourth embodiment includes a function to perform voice interaction with a user using a natural language and to use a voice interactive service associated with a plurality of trigger words registered therein. One of the voice interactive services therein is achieved in the voice interactive device 1 without performing communication with voice interactive services on the internet.

FIG. 15 shows an outline of the voice interactive system including the voice interactive device 1 of the fourth embodiment. As compared to the outline of the voice interactive system of the voice interactive device 1 of the first embodiment, the example of FIG. 15 includes a voice interactive service C2-3 in the voice interactive device 1.

The voice interactive service C2-3 includes, as with the voice interactive service A2-1 and the voice interactive service B2-2, a voice recognition system 211, intention understanding system 212, and interaction processing system 213.

The voice interactive service C2-3 which is internally implemented in the voice interactive device 1 may provide a service equivalent to the service of the voice interactive service A2-1 or the service of the voice interactive service B2-2, or may provide a part thereof.

Thus, user 5 can receive a voice interactive service 2 without connecting the voice interactive device 1 to the voice interactive service A2-1 or the voice interactive service B2-2 through the network 3.

Furthermore, the voice interactive service C2-3 in the voice interactive device 1 may provide a voice interactive service related to a use method of the voice interactive device 1, for example. Thus, if user 5 has some troubles in starting up the voice interactive device 1, user 5 can obtain trouble shooting from the voice interactive device 1 by simply speaking thereto without connecting the network.

Furthermore, a network trouble or the like may prevent the voice interactive device 1 from accessing the voice interactive service A2-1 or the voice interactive service B2-2. If, for example, the communication controller 204 detects a case where the voice interactive device 1 cannot be accessible to the voice interactive service A2-1 or the voice interactive service B2-2, a reply to the speech of user 5 may be generated by the voice interactive service C2-3.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

In addition, in some cases, in order to make the description clearer, the respective parts are illustrated in the drawings schematically, rather than as an accurate representation of what is implemented. However, such schematic illustration is merely exemplary and in no way restricts the interpretation of the invention. In the drawings, reference numbers of continuously arranged elements equivalent or similar to each other are omitted in some cases. In addition, in the specification and drawings, structural elements equivalent or similar to those described in connection with preceding drawings are denoted by the same reference numbers, and detailed description thereof is omitted unless necessary. Further, a device of the present invention may be expressed as a control logic, a program including instructions which cause a computer to operate, or a recording medium which holds the instructions and which a computer can read. Furthermore, the names and terms are not particularly limited to those used here, but some other expressions, if they are substantially of the same contents and meanings, may fall within the scope of the present invention.

What is claimed is:

1. A voice interactive device configured to transmit a voice content to a plurality of voice interactive services through a network, wherein the plurality of voice interactive services are selected based at least in part on the voice content, the voice interactive device comprising:
   a memory for storing instructions;
   a controller configured to execute the instructions to:
   transmit at least a first content after a detected utterance of a first keyword in the voice content to a first voice interactive service of the plurality of voice interactive services in response to the detected utterance of the first keyword being detected as a first trigger word;

transmit at least a second content after a detected utterance of a second keyword of the voice content to a second voice interactive service of the plurality of voice interactive services in response to the detected utterance of the second keyword being detected as a second trigger word; and stop transmitting, to the first voice interactive service, content that follows a detected utterance of the second keyword in the voice content following a detected utterance of the first keyword, and transmitting the content to the second voice interactive service in response to the detected utterance of the second keyword in the voice content following the detected utterance of the first keyword.

2. The voice interactive device of claim 1, wherein whether the first voice interactive service or the second voice interactive service of the plurality of voice interactive services is available is configurable by a user.

3. The voice interactive device of claim 2, wherein a time period available for the first voice interactive service or the second voice interactive service of the plurality of voice interactive services is configurable by the user.

4. The voice interactive device of claim 2, wherein the voice interactive device further comprises a display and whether the first voice interactive service and the second voice interactive service is available is configurable via the display.

5. The voice interactive device of claim 4, wherein an indicator is shown in the display for indicating a current active interactive voice service among the plurality of voice interactive services.

6. The voice interactive device of claim 5, wherein the indicator comprises a title, an icon, or a character indicating the current active interactive voice service.

7. The voice interactive device of claim 1, further comprising a visual service indicator for indicating a current active interactive voice service among the plurality of voice interactive services.

8. The voice interactive device of claim 7, wherein the controller is configured to execute the instructions to control a light emission color of the visual service indicator to indicate the currently active voice interactive service.

9. The voice interactive device of claim 7, wherein the controller is configured to execute the instructions to control a timing pattern of light emission of the visual service indicator to indicate the currently active voice interactive service.

10. The voice interactive device of claim 1, wherein the controller is further configured to execute the instructions to generate an audible indicator for indicating a current active interactive voice service among the plurality of voice interactive services.

11. The voice interactive device of claim 10, wherein the audible indicator comprises a speech indicating the current active interactive voice service.

12. The voice interactive device of claim 10, wherein the audible indicator comprises an audio pattern indicting the current active interactive voice service.

13. The voice interactive device of claim 1, wherein the controller is configured to execute the instructions to determine whether to switch from the first voice interactive service to the second voice interactive service based on a detected utterance of the first keyword or a detected utterance of the second keyword and states of the first voice interactive service and second voice interactive service, the states of the first voice interactive service and second voice interactive service comprising an execution state and a halt state.

14. The voice interactive device of claim 1, wherein the controller is configured to execute the instructions to: in response to detecting an utterance of a keyword different from the keyword associated with a currently-performed voice interactive service while performing an interaction process with respect to the currently-performed voice interactive service, halt the interaction process with respect to the currently-performed voice interactive service.

15. The voice interactive device of claim 1, further comprising a third voice interactive service which is operable without performing communication with the Internet.

16. The voice interactive device of claim 15, wherein the third voice interactive service is provided by the voice interactive device.

17. The voice interactive device of claim 16, wherein the third voice interactive service is related to a use method of the voice interactive device.

18. The voice interactive device of claim 17, wherein the third voice interactive service comprises interactive voice trouble shooting service for the voice interactive device.

* * * * *